(12) United States Patent
Gao et al.

(10) Patent No.: US 8,810,234 B2
(45) Date of Patent: Aug. 19, 2014

(54) METHOD OF CONTROLLING ACTIVE MATERIAL ACTUATION UTILIZING AN OPERATIONAL ENVELOPE

(75) Inventors: Xiujie Gao, Troy, MI (US); Guillermo A. Herrera, Winnetka, CA (US); Christopher P. Henry, Thousand Oaks, CA (US); Geoffrey P. McKnight, Los Angeles, CA (US); Lei Hao, Troy, MI (US); Nancy L. Johnson, Northville, MI (US); Alan L. Browne, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 13/452,597

(22) Filed: Apr. 20, 2012

(65) Prior Publication Data

US 2012/0223727 A1 Sep. 6, 2012

Related U.S. Application Data

(63) Continuation-in-part of application No. 12/437,722, filed on May 8, 2009, now Pat. No. 8,188,757.

(60) Provisional application No. 61/051,351, filed on May 8, 2008.

(51) Int. Cl.
*G01N 27/92* (2006.01)

(52) U.S. Cl.
USPC ............... 324/71.1; 324/71.3; 324/691

(58) Field of Classification Search
USPC ................. 324/691, 71.1, 73.1
See application file for complete search history.

(56) References Cited

U.S. PATENT DOCUMENTS

2011/0128434 A1* 6/2011 Hata et al. ............ 348/349
2011/0277462 A1* 11/2011 Gregory et al. ............ 60/527

* cited by examiner

*Primary Examiner* — Vincent Q Nguyen

(57) ABSTRACT

A method of controlling and/or predicting the remaining useful life of an active material actuator, such as a shape memory alloy wire, includes obtaining historical actuation data of an inherent system variable, such as electrical resistance, over a secondary variable, such as time, determining a normal operating envelope having upper and lower bounds based on the data, determining a current profile for a given actuation cycle, and comparing the shape of the current profile to the envelope to determine an out-of-bounds event.

20 Claims, 3 Drawing Sheets

METHOD OF CONTROLLING ACTIVE MATERIAL ACTUATION UTILIZING AN OPERATIONAL ENVELOPE

RELATED APPLICATIONS

This patent application is a continuation-in-part from U.S. Non-provisional patent application Ser. No. 12/437,722, entitled "METHOD OF CONTROLLING A SHAPE MEMORY ALLOY ACTUATOR UTILIZING RESISTANCE CHANGE" and filed on May 8, 2009, which makes reference to, and claims priority to and benefit from U.S. Provisional Patent Application Ser. No. 61/051,351, entitled "CONTROL METHODS FOR SMA ACTUATORS," filed on May 8, 2008, the disclosures of which being incorporated by reference herein.

BACKGROUND OF THE INVENTION

1. Field of the Invention

The present disclosure generally relates to methods of controlling active material actuators, and more particularly, to a method of controlling and/or predicting the remaining useful life of an active material actuator, such as a shape memory alloy actuator, utilizing an operational envelope developed based on an inherent system variable, such as resistance, over a secondary variable, such as time (e.g., the change in resistance inherent to the actuator over an actuation cycle).

2. Discussion of Prior Art

Among active material actuators, shape memory alloy (SMA) actuators, in the Martensite phase, are activated by heating the SMA material to a temperature that is above a prescribed value. This causes the material to undergo phase transformation from the Martensite to the Austenite phase, wherein it contracts and in the process provides linear or angular displacement. A common method of activation involves resistively heating the SMA by applying an electrical current therethrough. Concerns with using SMA actuators continue to include overheating, i.e., applying an excess of heat energy above what is required to actuate the wire, and overloading, i.e., applying an excessive stress load, for example, by blocking the output. Overheating and overloading can cause longer cooling times, reduced system response bandwidth, and in some cases damage to the wire. It is therefore desirable to have an effective and robust means of controlling wire actuation to prevent overheating and overloading, to provide consistent output and streamlined actuation over the life of the actuator, and to accurately predict the remaining useful life of the actuator.

Traditionally, various external sensors and/or mechanical devices, such as temperature and position sensors, have been used to alleviate concerns relating to overheating, overloading, and variation/degradation in output. However, these provisions add to the complexity, costs, and packaging requirements of conventional actuators. Closed-loop controls have been developed that monitor absolute actuator resistance to detect, among other things, start of actuation, end of actuation, overload, and/or reset or ready for next actuation cycle state. These methods, however, present their own limitations. For example, hysteresis of the resistance, relatively small (5-10%) change in electrical resistivity, small value of intrinsic resistivity, and external factors, such as noise and ambient conditions, have all impacted the reliability of these approaches.

BRIEF SUMMARY OF THE INVENTION

The present invention addresses these concerns by providing a novel method of controlling an active material actuator, such as a shape memory alloy wire actuator, that utilizes an operating envelope or window developed from historical data to monitor the shape of a current profile. The invention is useful, among other things, for discovering overheating, overloading, and other harmful events during an actuation cycle, and for providing accurate feedback that mitigates the abovementioned concerns. The invention is useful for protecting the integrity of the actuator, as well as the mechanism driven thereby, and allows for recognition of harmful events at all stages of actuation. The invention provides a method that may be implemented solely through firmware updates, thereby eliminating the need for additional hardware. Replacement of hardware reduces the number of failure modes possible, and further reduces the cost, bulk, and design complexity of the actuated systems. Finally, the invention is also useful for providing a method of predicting the remaining useful life an active material actuator based on an assessment of historical data comprising normal and out-of-bounds events, and therefore, for enabling the replacement of actuators prior to catastrophic failure.

The invention generally concerns a method of controlling and/or predicting a remaining useful life of an active material actuator (e.g., shape memory alloy wire) presenting an inherent system variable. The method includes obtaining historical data on the inherent system variable versus a second variable, wherein at least a portion of the data was produced during normal actuation events, and establishing upper and lower bounds based the historical data. The bounds present upper and lower profiles of the inherent system variable versus the second variable indicative of normal actuation, respectively. Next, an activation signal is applied to the actuator, so as to define a start activation point and activate the actuator over an actuation cycle. The inherent system variable versus the second variable is monitored during the cycle, so as to determine a current profile, and the current profile is compared to the upper and lower profiles, so as to determine an out-of-bounds event. When such an event is determined, the method generates a response and/or performs an action.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures, wherein.

DETAILED DESCRIPTION OF THE INVENTION

Figure 1:
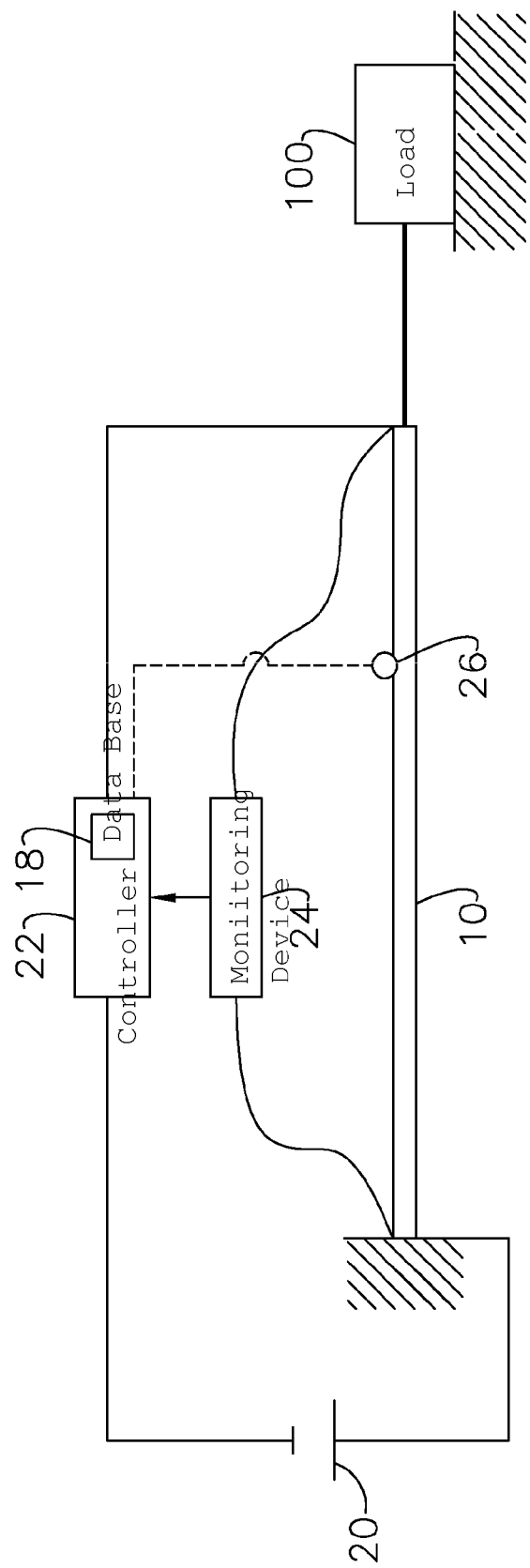
FIG. 1 is a schematic diagram of an actuation system, including an electric power source, shape memory alloy actuator wire drivenly coupled to a load, a controller intermediate the source and actuator, and operatively coupled to the actuator, and a monitoring device communicatively coupled to the controller, in accordance with a preferred embodiment of the invention.

The following description of the preferred embodiments is merely exemplary in nature and is in no way intended to limit the invention, its application, or uses. As described and illustrated herein, a novel method of controlling and/or predicting the remaining useful life of an active material actuator 10 is presented (FIGS. 1-5). In general, the method includes obtaining historical actuation data of an inherent system variable, such as resistance over time, determining a normal operating envelope 12 (FIG. 3) defined by upper and lower bounds 14u,l derived from the data, determining a current profile 16 during an actuation cycle, and comparing the profile 16 to the envelope 12, so as to determine an out-of-bounds event. In another aspect of the invention, from the number and severity of such events, the remaining useful life may be accurately predicted. The present invention is suitable for use with any active material actuator 10 that undergoes a measurable change in an inherent variable profile during a normal actuation cycle, but is particularly suited for use with shape memory alloy actuation as further described below.

As used herein the term "active material" is defined as any material or composite that exhibits a reversible change in fundamental (i.e., chemical or intrinsic physical) property when exposed to or precluded from an activation signal. Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be pseudo-plastically deformed and upon exposure to some higher temperature will transform to an Austenite phase, or parent phase, and return, if not under stress, to their shape prior to the deformation.

Shape memory alloys exist in several different temperature-dependent phases. The most commonly utilized of these phases are Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Thus, a suitable activation signal for use with shape memory alloys is a thermal activation signal having a magnitude sufficient to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite phase transformation, and the material will recover the original, annealed shape. Hence, one-way shape memory effects are only observed upon heating. Active materials comprising shape memory alloy compositions that exhibit one-way memory effects do not automatically cycle with temperature changes back and forth between two shapes, and require an external mechanical force to deform the shape away from its memorized or taught geometry.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effect are composite or multi-component materials. They combine an alloy that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of approximately 2.5 times and a dimensional change of up to 8% (depending on the amount of pre-strain) when heated above their phase transition temperature. It is appreciated that where the SMA is one-way in operation, a biasing force return mechanism (such as a spring) would be required to return the SMA to its starting configuration. Finally, it is appreciated that Joule heating can be used to make the entire system electronically controllable.

Returning to the inventive method, the historical data is collected on an inherent system variable (e.g., actuator resistance, a derivative of actuator resistance, applied voltage, measured strain, etc.) that changes over a second variable (e.g., time, temperature, displacement, etc.), so as to define an x-y profile, during its actuation cycle. At least a portion of the data is produced during normal actuation events, so that targeted or normal performance data is collected. Based on the normal actuation data, upper and lower bounds $14u,l$ presenting upper and lower profiles are established, wherein the upper and lower bounds/profiles $14u,l$ comprise, for example, the maximum and minimum values of the inherent system variable versus the second variable observed during normal actuation. The actuator 10 may then be safely controlled by applying an activation signal to the actuator 10, so as to define a start activation point and monitoring the inherent system variable versus the second variable during the cycle. The current system variable values are used to develop a temporally current profile 16. Next, the current profile 16 is compared to the upper and lower bounds $14u,l$ visually or computatively, so as to determine an out-of-bounds event. Thus, the profile 16 is observed to determine whether it is within the "operating envelope" 12 (FIG. 2) defined by the data. Finally, a response is generated or action autonomously taken (e.g., modifying/terminating the activation signal), when an out-of-bounds event is determined.

An out-of-bounds event is preferably determined when the monitored profile 16 exceeds the upper or lower bound for a minimum period, so that anomalies, due to, for example, momentary slippage of attachments or power surges, as well as natural fluctuations in the inherent variable during the cycle are accounted for. Alternatively, or in addition to a minimum period, an out-of-bounds event may be identified when the profile 16 exceeds the upper or lower bounds $14u,l$ over a specific second variable value or range. In another alternative, an out-of-bounds event may be established when the monitored profile 16 exceeds the upper or lower bound by a minimum percentage (e.g., 5%).

As previously stated, the upper and lower bounds $14u,l$ may be established based on the maximum and minimum values observed for the inherent system variable at a given secondary variable value. Alternatively, the upper and lower bounds $14u,l$ may be established by determining an ideal profile based on ideal conditions (e.g., ideal voltage, temperature, construction, pre-strain, etc.), and applying an allowance to the ideal profile; or, where the historical data consists of the preceding cycle profile, by applying a deviation tolerance to the preceding profile. The envelope 12 may be modified based on a sensed value of an influential condition, e.g., the ambient temperature, actuator temperature, actuator strain, loading history, usage/cycles, actual voltage, and nominal drive current, etc., so that false positive events are avoided. Modification may result from entering a sensed condition value into a predetermined formula or algorithm, or from searching a look-up table for the condition value in order to obtain a corresponding factor, allowance, deviation, or otherwise resultant effect. Moreover, the preferred bounds $14u,l$ are modified with any changes to the physical and inherent characteristics of the actuator 10 (e.g., length, composition, diameter, pre-strain, etc.), or the type of application to be performed (e.g., critical, moderate, etc.). Thus, the condition may be external or internal to the actuator 10. In another example, it is appreciated that worst-case-scenario bounds $14u,l$ may be utilized for a given set of conditions based on the capacity of the actuator 10.

Figure 3:
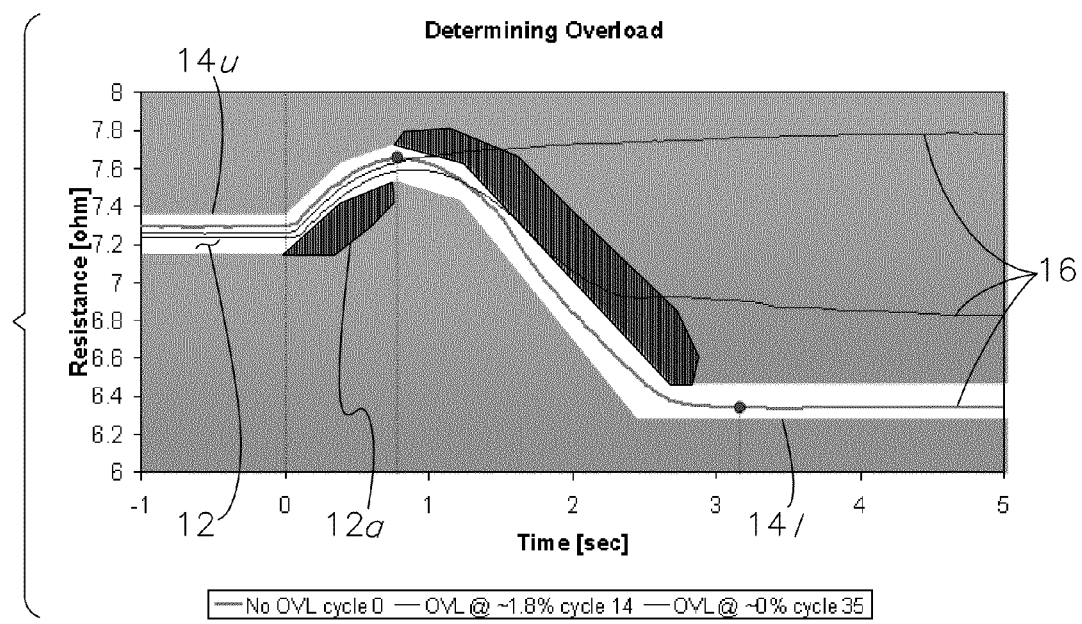
FIG. 3 is a line graph of the resistance of an SMA actuator over time during multiple actuation cycles, an operating envelope defined by upper and lower boundaries, and secondary envelopes, wherein two of the cycle profiles define out-of-bounds events, in accordance with a preferred embodiment of the invention.

Once the bounds $14u,l$ are established, an actuation cycle may be monitored, so as to determine a current profile 16, and an out-of-bounds event when the current profile exceeds (i.e., is higher than the upper and lower than the lower) one of the bounds $14u,l$. The deviation may be categorized as one-time events, drifting or signals, or according to the position (e.g., timing) of the out-of-bounds event. As previously stated, the method then generates a response (e.g., alerts a user that the actuator did not perform as expected), or otherwise autonomously performs an action. For example, the activation signal may be modified, interrupted, or terminated in the case of an overload or overheating event. FIG. 3 illustrates secondary envelopes 12a, wherein an out-of-bounds event less than the lower bound during a rise or greater than the upper bound during a fall is deemed to indicate an insufficient activation signal (e.g., heating rate or drive current). Here, the system is preferably operable to autonomously cause a corresponding increase in the activation signal.

In another aspect of the invention, the preferred response further includes maintaining a record of the out-of-bounds event so as to update the historical data, and more preferably, categorizing the event within the data based on severity. Out-of-bounds data may or may not be used in the determination of boundaries $14u,l$. In a preferred embodiment, severity is determined based on the initial second variable value (e.g., start time) and/or the range of second variable values (e.g., period/duration) of the event. Based upon the appreciated relationship between useful life and detrimental events, the response may further include autonomously updating a predicted remaining useful life based on the historical data, including the number of normal and out-of-bounds events, and then alerting a user to replace the actuator 10 when the remaining useful life is less than a predetermined threshold (e.g., less than 5% of the useful life).

Finally, it is appreciated that the historical data may be compiled from usage of the actuator 10, or more preferably from past usage of the actuator 10 plus other equivalent actuators in comparable conditions, and under similar loading, so as to anticipate future performance, etc. With respect to the latter, it is appreciated that an exhaustive database 18 of actuators, conditions, and loading may be maintained and applied across a broad spectrum, and that the envelope 12 may be updated in real-time or periodically (e.g., after an out-of-bounds event, etc.).

In the preferred embodiment, the invention is employed by a shape memory alloy wire 10 drivenly coupled to a load 100 (FIG. 1), so as to perform useful mechanical work, and communicatively coupled to an activation source 20 (e.g., the charging system of a vehicle (not shown)), wherein the term "wire" is non-limiting, and shall include other similar geometric configurations presenting tensile load strength/strain capabilities, such as cables, bundles, braids, ropes, strips, chains, and other elements. A controller 22 hosting the database 18 is intermediately coupled to the actuator 10 and source 20, and programmably configured to selectively cause the actuator 10 to be activated, and implement the method as described. Lastly, a monitoring device 24 is communicatively coupled (e.g., wirelessly or via hardwire) to the controller 22 and operable to retrieve data from the actuator 10, e.g., via a sensor 26 (FIG. 1). It is appreciated that the monitoring device 24, controller 22, and/or sensor 26 may present an integral unit.

In this configuration, the actuator 10, source 20, and controller 22 may compose an electric circuit operable to activate the SMA actuator 10 through Joule heating, and the resistance offered by the actuator 10 for a given amperage may be used to develop historical data of resistance versus time. More particularly, the preferred inherent system variable is the electrical resistance of the actuator 10 and the preferred second variable is time, so as to develop a return signal based on electrical resistance change, as it is appreciated that the electrical resistance varies consistently with the percentage of phase transformation and temperature of the SMA, and can be correlated to the position and health of the actuator 10. Although the derivative of resistance provides more definitive actuation event indication, including a pronounced end of actuation valley (FIG. 2) as parentally disclosed, it is appreciated that the relative lack of complexity in the resistance profile of SMA during actuation facilitates comparisons of profile shapes.

Figure 2:
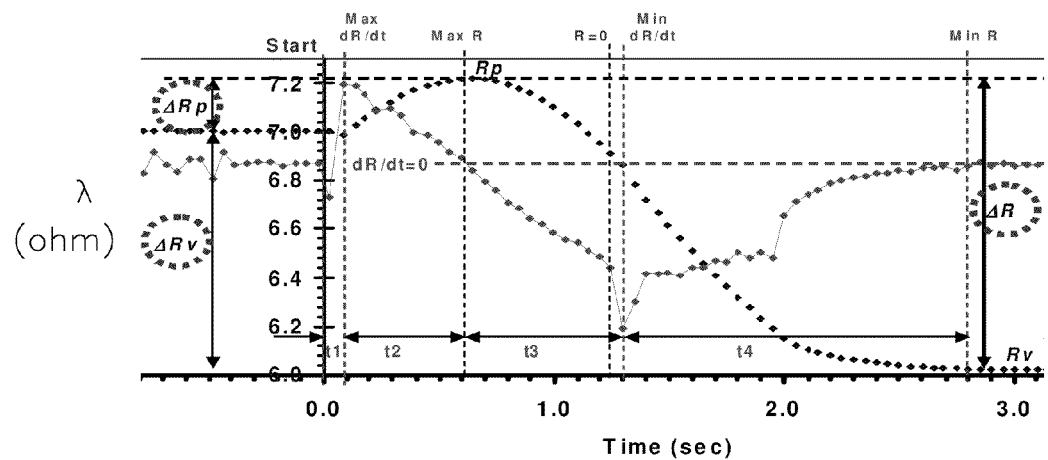
FIG. 2 is an exemplary line graph of the resistance of an SMA actuator during an actuation cycle, and the first derivative of the resistance over time.
Figure 4:
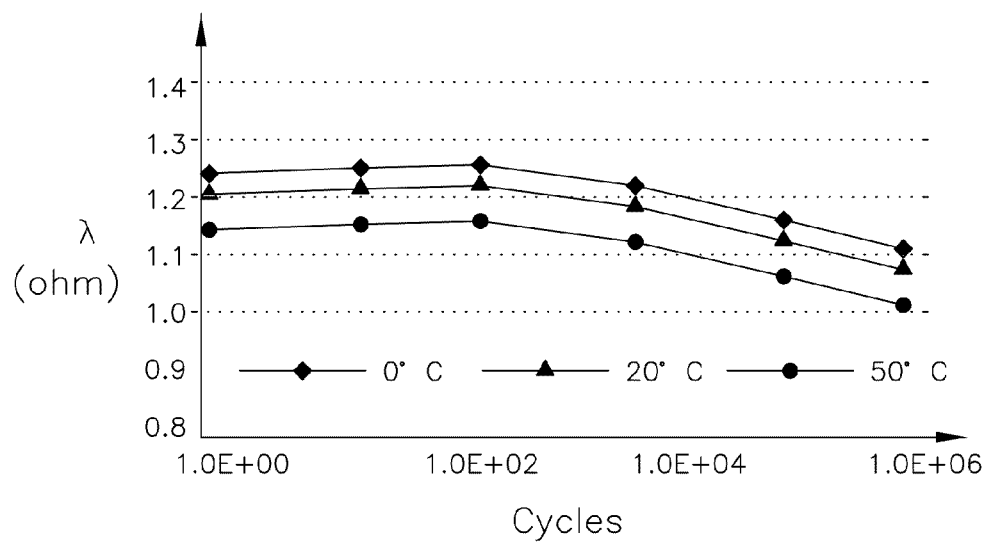
FIG. 4 is a line graph of the total change in resistance, $\Delta R$, of an SMA actuator versus cycles taken over plural temperature observations.

In FIG. 2 it is shown that a normally activated SMA actuator presents a resistance profile having a generally constant or flat initial heating period, followed by a rise in resistance, $\Delta R_p$, due to the start of phase transformation that culminates at the peak SMA resistance, $R_p$ (which typically occurs shortly after strain initiates), and then an extended fall in resistance, $\Delta R_v$, until reaching the Austenite resistance, $R_v$. As shown in FIG. 4, the total change in resistance $\Delta R$ has been found to correspond to the usage/cycles of the actuator 10, particularly where the usage exceeds ten-thousand cycles. Moreover, it is appreciated that $\Delta R$ is inversely proportional to temperature, as also shown in FIG. 4. Therefore, by determining $\Delta R$ for a given temperature (and/or similarly amperage, strain, etc.), an accurate assessment of the number of prior cycles may be made, and the remaining life predicted (i.e., recommended usage minus prior cycles). Alternatively, it is appreciated by those of ordinary skill in the art that the "miner rule" or proprietary life correlation methods may be used to predict the remaining useful life of the actuator 10.

Whereas it is appreciated that SMA resistance fluctuates at the activation start point due to various factors (e.g., previous temperature and usage conditions, etc.), monitoring is preferably initiated at a predetermined reference point (e.g., peak resistance) subsequent to the start activation point. In SMA wire actuator applications, the out-of-bounds event may indicate an insufficient heating rate as previously stated, an overload event, overheating event, wire fatigue, attachment slippage, attachment degradation, and/or degradation of peripheral mechanisms (e.g., pivots, pulleys, sliding guides, etc.) depending upon event characteristics. For example, it is appreciated that an overheating event is indicated by a valley 28 followed by a rise in the resistance versus time profile (FIG. 5).

Figure 5:
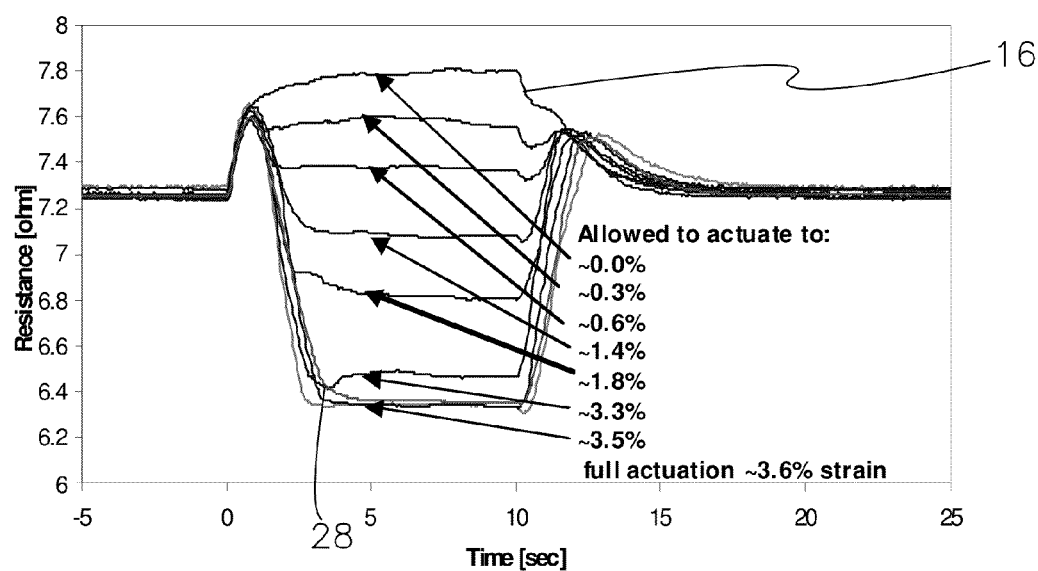
FIG. 5 is a line graph of the resistance of an SMA actuator versus time taken over multiple actuation cycles, including a plurality of overload/overheating cycles presenting differing achieved strains.

In FIG. 5, various overload resistance traces of a SMA wire actuator 10 encountering overload events at differing strains are shown. As illustrated, the shape of the trace is significantly affected when the SMA encounters an overload and may be detected using the proposed envelope of operation method. Thus, by identifying the shape of the profile 16, the type of overload/overheating event (e.g., where the blockage is occurring) may be determined. Lastly, it is appreciated that various monitoring devices 24 for accurately measuring resistance change within the wire 10, and algorithms for execution by the controller 22 are parentally presented. For example, the device 24 may include a Wheatstone bridge set-up, a resistor-capacity (RC) circuit, and a superimposed AC signal atop the regular activation signal.

This written description uses examples to disclose the invention, including the best mode, and also to enable any person skilled in the art to make and use the invention. The patentable scope of the invention is defined by the claims, and may include other examples that occur to those skilled in the art. For example, it is certainly within the ambit of invention for the envelope 12 to define a three-dimensional space under a more complex regime, wherein, the inherent system variable (e.g., resistance) changes and is monitored over second (e.g., time) and third (e.g., strain) variables concurrently. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A method of controlling and/or predicting a remaining useful life of an active material actuator presenting an inherent system variable, said method comprising:
    a. compiling historical data on the inherent system variable versus a second variable, wherein at least a portion of the data was produced during normal actuation events;
    b. establishing upper and lower bounds of the inherent system variable versus the second variable indicative of normal actuation based the historical data;
    c. applying an activation signal to the actuator, so as to define a start activation point and activate the actuator over an actuation cycle;
    d. monitoring the inherent system variable versus the second variable during the cycle, so as to produce a current profile;
    e. comparing the current profile to the upper and lower bounds, so as to determine an out-of-bounds event; and
    f. generating a response and/or performing an action, when the event is determined.

2. The method as claimed in claim 1, wherein the actuator is a shape memory alloy wire, the inherent system variable is the electrical resistance of the wire, and the second variable is time, so as to develop a return signal based on electrical resistance change.

3. The method as claimed in claim 1, wherein step e) further includes the steps of determining an out-of-bounds event when the current profile exceeds the upper or lower profile over a minimum period.

4. The method as claimed in claim 1, wherein step e) further includes the steps of determining an out-of-bounds event when the current profile exceeds the upper or lower profile at a predetermined second variable value.

5. The method as claimed in claim 4, wherein step e) further includes the steps of determining an out-of-bounds event when the current profile exceeds the upper or lower profile by a minimum percentage.

6. The method as claimed in claim 5, wherein the minimum percentage is five.

7. The method as claimed in claim 1, wherein step b) further includes the steps sensing an influential condition external to the actuator, and establishing the bounds based in part on the condition.

8. The method as claimed in claim 1, wherein step b) further includes the steps sensing an influential condition internal to the actuator, and establishing the bounds based in part on the condition.

9. The method as claimed in claim 1, wherein step b) further includes the steps of sensing an influential condition, searching a look-up table based on the condition, and establishing the bounds based on the look-up table.

10. The method as claimed in claim 1, wherein step b) further includes determining an influential condition selected from the group consisting essentially of ambient temperature, actuator temperature, actuator strain, loading history, usage/cycles, actual voltage, and nominal drive current.

11. The method as claimed in claim 1, wherein the response is maintaining a record of and categorizing the event.

12. The method as claimed in claim 1, wherein the response is modifying, interrupting, or terminating the activation signal.

13. The method as claimed in claim 1, wherein the event is selected from the group consisting essentially of an overload event, overheating event, actuator fatigue, attachment slippage, attachment degradation, and degradation of a peripheral mechanism.

14. The method as claimed in claim 13, wherein the event is an overload event, and steps e) and f) further includes the steps of determining a severity for the overload event, and adding the overload event and the severity to the historical data.

15. The method as claimed in claim 14, wherein step f) further includes the steps of predicting a remaining useful life based on the historical data.

16. The method as claimed in claim 14, wherein step e) further includes determining an initial second variable value and a range of second variable values during the event, and the severity is determined based on initial second variable value and a range of second variable values.

17. The method as claimed in claim 1, wherein step b) further includes the steps of establishing upper and lower bounds by determining an ideal profile based on the historical data, and applying an allowance to the ideal profile.

18. The method as claimed in claim 1, wherein the historical data consists of a preceding current profile, and step b) further includes the steps of establishing upper and lower bounds by applying a deviation tolerance to the preceding current profile.

19. The method as claimed in claim 1, wherein step d) further includes the steps of initiating monitoring at a predetermined reference point subsequent to the start activation point.

20. The method as claimed in claim 1, wherein the inherent system variable is selected from the group consisting essentially of actuator resistance, a derivative of actuator resistance, and applied voltage, and the second variable is selected from the group consisting essentially of time, temperature, and displacement.

* * * * *